United States Patent [19]

Bruhnke et al.

[11] 4,451,077
[45] May 29, 1984

[54] STRUCTURALLY REINFORCED MOTOR VEHICLE BODIES

[75] Inventors: Ulrich Bruhnke, Ehningen; Bernd Christoph, Sindelfingen; Bernd Harloff, Böblingen; Hans Krakat, Sindelfingen, all of Fed. Rep. of Germany

[73] Assignee: Daimler-Benz Aktiengesellschaft, Fed. Rep. of Germany

[21] Appl. No.: 328,265

[22] Filed: Dec. 7, 1981

[30] Foreign Application Priority Data

Dec. 6, 1980 [DE] Fed. Rep. of Germany ....... 3046056

[51] Int. Cl.³ .............................................. B60R 21/04
[52] U.S. Cl. ................................... 296/185; 296/188; 296/191; 296/146; 296/76; 180/69.2
[58] Field of Search ................ 52/483; 248/74 A; 296/192, 185, 187, 188, 191, 146, 76; 427/236; 180/69 R

[56] References Cited

U.S. PATENT DOCUMENTS 2,338,006 12/1943 Morehouse ..................... 248/74.5
3,227,575 1/1966 Ziebart ............................ 427/236

FOREIGN PATENT DOCUMENTS 3011345 10/1981 Fed. Rep. of Germany .
403899 1/1934 United Kingdom ............ 52/528
616212 1/1949 United Kingdom ............ 248/74.3

Primary Examiner—James L. Ridgill, Jr.
Attorney, Agent, or Firm—Craig & Burns

[57] ABSTRACT

A flat structural part for a motor vehicle body with the flat structural part forming, for example, a hood, a cover, or a door of the motor vehicle and being reinforced by pipes along a side of the edges, with the pipes being arranged at a distance from an outer covering of the structural part that may partially reach around the pipes either from above or below or from above and below, with the retaining pipes being connected with an edge area of the outer covering. The outer covering and retaining clips enclose an approximately wedge-shaped space that tapers off in a direction of the edge, with a space between the pipe and outer covering having a size that permits a free passage of a spray jet aimed thereat.

15 Claims, 5 Drawing Figures

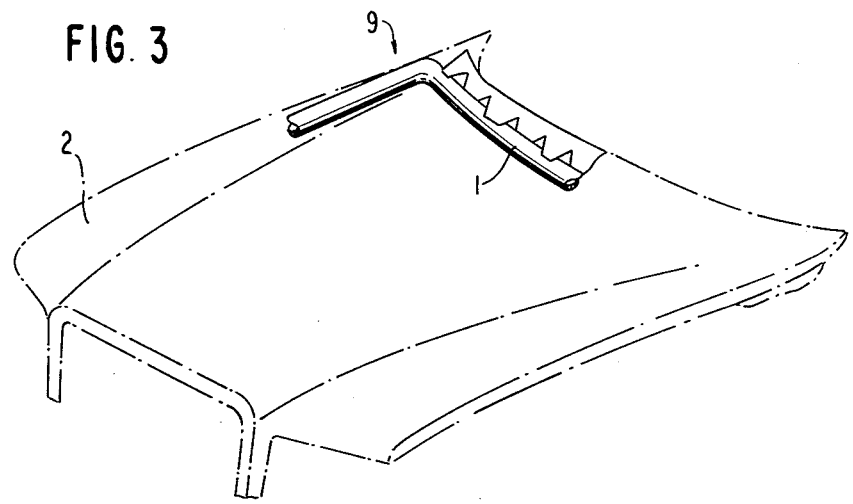
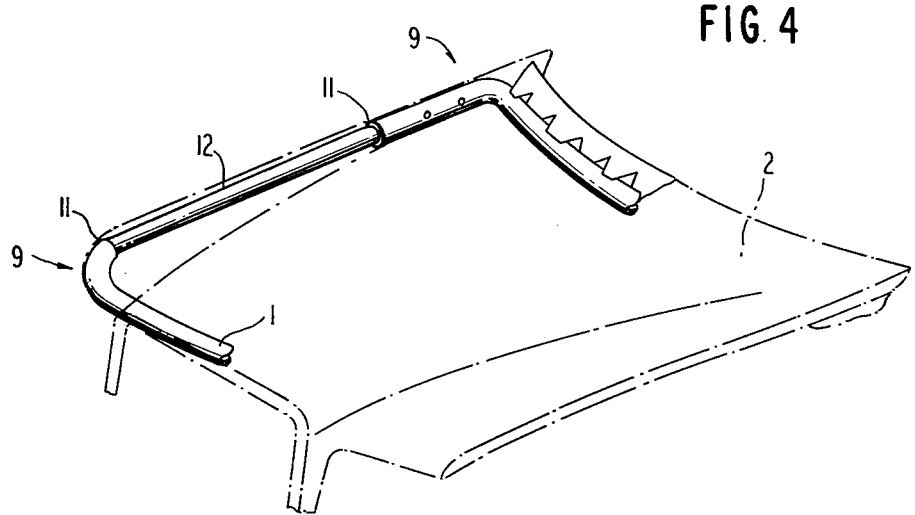
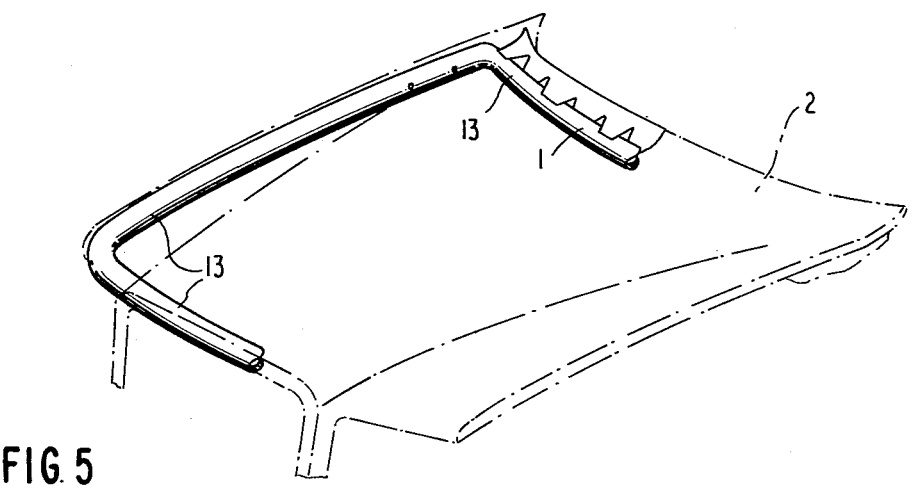

STRUCTURALLY REINFORCED MOTOR VEHICLE BODIES

The present invention relates to a motor vehicle body and, more particularly, to flat structural parts of motor vehicle bodies enforced by pipe-like members, especially, for example, hoods, covers, and doors reinforced on a side along edges thereof with the pipes being arranged at a distance from an outer covering of the structural part by means of retaining clips which extend at least partially around the pipes and are connected to the outer covering.

In, for example, German Patent Application Pat. No. 30 11 345.2, an arrangement of the aforementioned type is proposed wherein a distance from an outer covering of a larger pipe diameter is relatively small with a space being located behind the pipe between the covering and the retaining clip, with the space expanding approximately funnel-shaped in a direction of an edge of the outer covering.

While an arrangement of the aforementioned type meets high stability requirements and may be manufactured quite easily, since the parts after their assembly and before the application of a corrison protection lacquer must be cleaned by means of, for example, a jet spray of cleansing fluid aimed at the surfaces of the parts to be treated, with such a proposed arrangement, the spraying jet is aimed at the space serving as an opening and can only reach a partial area of the space that expands toward the edge of the outer covering, namely, the partial area that is located directly behind the opening thereby resulting in an early corrison of areas that were not treated. This is especially true the narrower the distance between the outer covering and the pipe so that, by a premature reflection of the jet spray, penetration of the spray into the hollow space that is to be cleaned is not possible. Additionally, with a corresponding positioning of the pipe, the cleansing fluid in this arrangement cannot drain off completely thereby resulting in a damming up of the fluid at the lowest point of the space on the outer sheet.

The aim underlying the present invention essentially resides in providing flat structural parts for motor vehicle bodies which include pipe or pipe-like reinforcing members arranged in such a manner that all areas of the body of a motor vehicle be treated, especially those areas between an outer body covering and a retaining clip, may be reached by a spray jet of treating fluid which fluid, after carrying out its effect, may then readily be completely drained off, while nevertheless maintaining given advantages with regard to stability of a pipe or pipe member reinforced motor vehicle body construction.

In accordance with advantageous features of the present invention, an outer covering and the retaining clips enclose a space that, in an approximately wedge-shape fashion, tapers off toward an edge, with the space between the pipe and outer covering having a size that permits a free passage of an aimed spraying jet of treating fluid.

By virtue of the above-noted features of the present invention, a space located behind the opening can be reached completely by a spray jet of the fluid with the fluid then, due to the wedge-shape of the enclosed space, in accordance with the arrangement of the retaining clips, either drain off through the passage opening of the spray jet or over side edges of the retaining clips.

In accordance with the present invention, the pipes or pipe members in corridor areas of the flat motor vehicle part may be connected with adjacent reinforcing elements, with the pipes or pipe members at their ends being closed off for reasons of protection against corrosion. The adjacent reinforcing elements may, for example, be constructed as stiffening angle members, sheets, or pipes.

It is also possible in accordance with the present invention, to extend the pipes around corner areas of the flat structural motor vehicle part and, in this case, the pipe end sections that face each other may be connected by a pipe-shaped connecting element with each other, or the pipes may form a preferably one piece frame which significantly increases a stiffness of the structural parts.

The retaining clip or clips connected with the edge area of the outer body covering may extend around the pipe from below and/or above. In this case, it is advantageous if, with a retaining clip that reaches around the pipe from below, that the retaining clip, at the lowest point, next to its connection with the pipe, has at least one discharge opening through which the spraying fluid may subsequently be drained off. At the same time, an equalization of pressure between the spraying jet and the atmosphere may be accelerated through the at least on discharge opening.

With the retaining clips that extend around the pipe from above or alternatively or arbitrarily from above and below, no openings are required for the retaining clips since, in these cases, the spraying fluid may drain off directly over the wedge-shaped retaining clips or free spaces existing between the two types of clips.

Accordingly, it is an object of the present invention to provide flat structural parts reinforced by pipes or pipe-like members for motor vehicle bodies which avoids, by simple means, shortcomings and disadvantages encountered in the prior art.

Another object of the present invention resides in providing flat structural parts reinforced by pipes or pipe like members for motor vehicle bodies which ensures a complete treatment of all portions of the structural parts with a treating fluid subsequent to an assembly of the structural parts.

Yet another object of the present invention resides in providing flat structural parts reinforced by pipes or pipe like members for motor vehicle bodies which is simple in construction and therefore relatively inexpensive to manufacture.

A still further object of the present invention resides in providing flat structural parts reinforced by pipes or pipe like members for motor vehicle bodies which ensures the stability of the structural parts.

These and other objects, features, and advantages of the present invention will become more apparent from the following description when taken in connection with the accompanying drawing which shows, for the purposes of illustration only, several embodiments in accordance with the present invention, and wherein:

FIG. 3 is a partially schematic perspective view of yet another embodiment constructed in accordance with the present invention with a pipe or pipe-like member extending around edges of a structural part;

FIG. 4 is a partially schematic perspective view similar to FIG. 3, with a connecting element for connecting ends of the pipes or pipe-like members that face each other; and FIG. 5 is a partially schematic perspective view of a pipe or pipe-like member reinforcement arrangement for a structural part constructed in accordance with the present invention forming a one piece frame.

Figure 1:
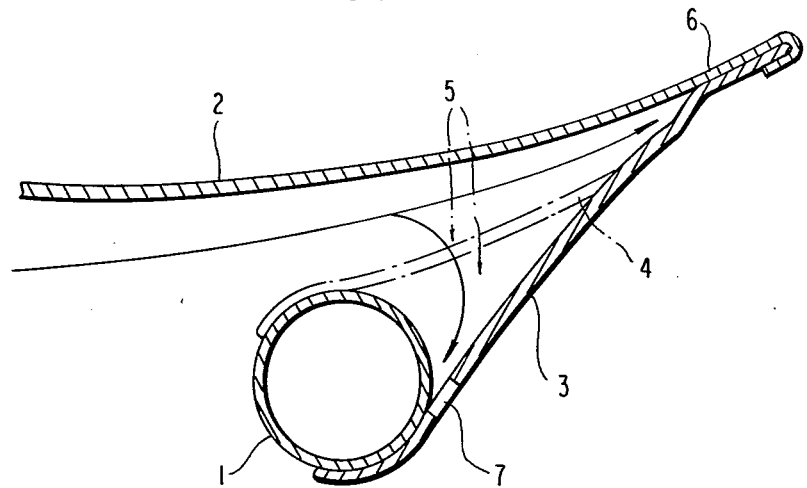
FIG. 1 is a partial cross sectional lateral view through a pipe connected with an outer body covering of a structural part of a body of a motor vehicle by means of retaining clips in accordance with the present invention.

Referring now to the drawings wherein like reference numerals are used throughout the various views to designate like parts and, more particularly, to FIG. 1, according to this figure, a reinforcement means in the form of, for example, pipes or pipe-like members 1 are arranged at a distance from an outer covering 2 of a structural part of the body of a motor vehicle. The pipe 1 is connected with the outer body covering 2 by means of retainer clips 3 and/or 4 which are connected with the pipe 1 by, for example, gluing, welding, or riveted. The outer body covering 2 may form a body part which is, for example, mounted so as to be hinged by means of hinge joints (not shown). In this manner, the pipe 1 is arranged in such a way that a space generally designated by the reference numeral 5 is located between the outer covering and the retaining clips 3 and/or 4 which taper off in a direction of an edge 6 of the outer covering 2, with the spaces 5 having a wedge-shape.

As shown in FIG. 1, the retaining clips 3, illustrated in solid line, extend or reach around the pipe 1 on a portion of its circumference from below the pipe 1 whereas the retaining clips 4, shown in phantom line in FIG. 1, extend from and reach around the circumference of the pipe 1 from above. It is also possible as shown most clearly in FIG. 2, for the retaining clips 3, 4 to alternate so as to be connected to the pipe either from above or below, with the lower retaining clip 3 at a lowest point thereof near a connection with the pipe 1, being provided with at least one discharge means 7 formed, for example, as an opening or a seam when it is connected exclusively to the pipe 1 at the bottom. In FIG. 1, the reference numeral 8 represents an aimed spray jet of, for example, a cleansing or cleaning fluid directed into the spaces 5 between the retaining clips 3 and/or 4 and the outer body covering 2 and pipe member 1.

When, for cleaning the surfaces of the structural part, especially at the space 5, the spray jet 8 of cleaning or cleansing fluid is aimed at the space 8, all of the surfaces may, when necessary, through the use of, for example, a bent nozzle, be acted upon by the cleansing fluid and thus be cleaned. The cleansing fluid which may be dammed up or accumulate at the lowest point of the space 5 between the retaining clip 3 and pipe 1 may drain off through the discharge means 7 while in the case of alternating the upper and lower retaining clips 3 and 4 or all upper retaining clips 4, the cleansing fluid may drain off directly.

Figure 2:
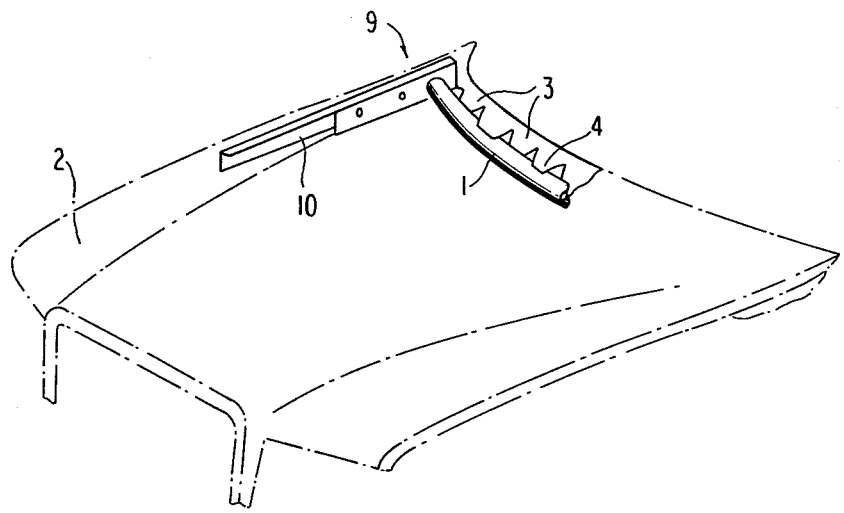
FIG. 2 is a partially schematic perspective view of an embodiment of the present invention constructed in accordance with the present invention with an alternate connection of retaining clips.

As shown most clearly in FIG. 2, in edge areas generally designated by the reference numeral 9 of the structural part to be reinforced, the pipe 1 is connected with an adjacent reinforcing element formed, for example, as an angled sheet member 10, with the pipe end being connected to the angle sheet member 10 in a conventional manner not shown in the drawings, However, as shown most clearly in FIG. 3, it is also possible for the pipe 1 to extend around the edge areas 9 of the structural part. FIG. 4 provides an example wherein two structural pipes 1 of the type illustrated in FIG. 3 extend around the edge areas 9 of the structural part and are in alignment with each other with a connecting element, formed for example, as a piece of pipe 12, being interposed between the pipe ends 11 of the respective pipes 1 so as to connect the pipes 1 to each other to form a frame consisting of several pipes. It is also possible as shown most clearly in FIG. 5, to provide a one-piece pipe frame. In this connection, the pipe frame may be pieced together and may be formed by several pipes 13 which are connected or inserted one within the other. While FIGS 2-5 have only illustrated the reinforcing pipe as being arranged along one edge of the structural part as can readily be appreciated if, for example, the structural body part is a hood of a motor vehicle, it is possible in accordance with the present invention to provide the reinforcing pipes 1 along both respective edges of the structural member or, in the case of FIG. 5, provide a pipe frame which extends completely around the structural part 2.

While the term "pipe" or pipe member 1 has been utilized in the instant specification, as can readily be appreciated, such term need not only be limited to parts with a ring-shaped cross section but also a may cover extrusions of a known type wherein the pipes may be also developed in one piece with the retaining clip 3 and/or 4. Likewise, plates, angle sheets, flat strips and other known structural parts may be used as stiffening and connecting elements.

While we have shown and described several embodiments in accordance with the present invention, it is understood that the same is not limited thereto but is susceptible of numerous changes and modifications as known to one having ordinary skill in the art, and we therefore do not wish to be limited to the details shown and described herein but intend to cover all such modifications as are encompassed by the scope of the appended claims.

We claim:

1. An automotive vehicle structural part having an outer covering, pipe means for reinforcing at least a portion of the structural part, a plurality of retaining clip means connected with an edge area of the outer covering for mounting the pipe means along at least a portion of at least one edge of the outer covering at a distance from the outer covering and the at least one edge, said retaining clip means and outer covering define a wedge-shaped space tapered in a direction of the at least one edge, wherein a space defined between the pipe means and the outer covering has a size sufficient to permit a free passage of a spary jet aimed thereat.

2. An automotive vehicle structural part according to claim 1, wherein the structural part forms a cover of a motor vehicle.

3. An automotive vehicle structural part according to claim 1, wherein the structural part forms a door of a motor vehicle.

4. An automotive vehicle structural part according to claim 1, wherein the flat structural part forms a hood of a motor vehicle.

5. An automotive vehicle structural part according to claim 4, wherein the retaining clip means are arranged so as to engage an outer circumference of the pipe means from a bottom side thereof.

6. An automotive vehicle structural part according to claim 2, wherein the retaining clip means are arranged so as to engage an outer circumference of the pipe means from a top side thereof.

7. An automotive vehicle structural part according to claim 4, wherein the retaining clip means are arranged so as to alternately engage an outer circumference of the pipe means from a top side and bottom side thereof.

8. An automotive vehicle structural part according to one of claims 4 or 5, wherein discharged means are provided at a lowest point of the retaining clip means for enabling a discharging of a fluid from the wedge-shaped space.

9. An automotive vehicle structural part according to one of claims 4, 5, 6, or 7, wherein reinforcing elements are provided for connecting the pipe means to side edges of the structural part.

10. An automotive vehicle structural part according to one of claims 4, 5, 6, or 7, where the pipe means is a one-piece pipe frame extending around the side edges of the outer covering.

11. An automotive vehicle structural part according to one of claims 4, 5, 6, or 7, wherein the retaining clip means are integrally formed with the pipe means.

12. An automotive structural part according to claim 11, wherein the outer covering includes corner areas, and in that the pipe means extends around at least one corner area.

13. An automotive vehicle structural part according to one of claims 4, 5, 6, or 7, wherein the outer covering includes corner areas, and the pipe means extends around at least one corner area.

14. An automotive vehicle structural part according to claim 13, wherein a connecting means is provided for connecting the pipe means with a further pipe means extending around an adjacent corner area of the outer covering.

15. An automotive vehicle structural part according to claim 14, wherein the connecting means is a pipe-shaped connecting element.

* * * * *

UNITED STATES PATENT AND TRADEMARK OFFICE
CERTIFICATE OF CORRECTION

PATENT NO. : 4,451,077
DATED : May 29, 1984
INVENTOR(S) : Bruhnke et al.

It is certified that error appears in the above-identified patent and that said Letters Patent is hereby corrected as shown below:

Column 4, line 53, change "spary" to --spray--.

Signed and Sealed this

Fifteenth Day of October 1985

[SEAL]

Attest:

Attesting Officer

DONALD J. QUIGG

Commissioner of Patents and Trademarks—Designate